(12) United States Patent
Haggquist

(10) Patent No.: US 7,850,766 B1
(45) Date of Patent: Dec. 14, 2010

(54) SYSTEMS AND METHODS FOR PREFERENTIALLY HEATING ACTIVE PARTICLES AND ARTICLES PRODUCED THEREOF

(75) Inventor: Gregory W. Haggquist, Longmont, CO (US)

(73) Assignee: Cocona, Inc., Boulder, CO (US)

( * ) Notice: Subject to any disclaimer, the term of this patent is extended or adjusted under 35 U.S.C. 154(b) by 915 days.

(21) Appl. No.: 11/514,700

(22) Filed: Aug. 31, 2006

Related U.S. Application Data

(60) Provisional application No. 60/713,447, filed on Aug. 31, 2005.

(51) Int. Cl.
*B01D 59/26* (2006.01)

(52) U.S. Cl. .............. 96/154; 96/108; 96/153; 96/226; 96/227; 95/90; 95/148; 95/900; 95/901; 95/903; 55/486; 55/516; 55/524; 427/180

(58) Field of Classification Search .......... 55/486, 55/516, 524; 95/90, 900, 901, 903; 96/108, 96/121, 131, 132, 154; 427/180
See application file for complete search history.

(56) References Cited

U.S. PATENT DOCUMENTS

| | | | | |
|---|---|---|---|---|
| 4,284,444 A | * | 8/1981 | Bernstein et al. | 156/60 |
| 4,540,625 A | * | 9/1985 | Sherwood | 442/365 |
| 5,217,616 A | * | 6/1993 | Sanyal et al. | 210/617 |
| 5,288,298 A | * | 2/1994 | Aston | 96/135 |
| 5,338,340 A | * | 8/1994 | Kasmark et al. | 96/135 |
| 5,874,052 A | * | 2/1999 | Holland | 422/171 |
| 6,066,591 A | * | 5/2000 | Murphy et al. | 502/417 |
| 6,840,986 B1 | * | 1/2005 | Koslow | 96/135 |
| 6,860,924 B2 | * | 3/2005 | Rajagopalan et al. | 96/154 |
| 6,911,189 B1 | * | 6/2005 | Koller et al. | 423/245.1 |
| 7,160,361 B2 | * | 1/2007 | Meiller et al. | 95/143 |
| 7,166,323 B2 | * | 1/2007 | Chung et al. | 427/180 |
| 7,276,166 B2 | * | 10/2007 | Koslow | 210/650 |
| 7,326,280 B2 | * | 2/2008 | Hrycak et al. | 96/108 |
| 2002/0078828 A1 | * | 6/2002 | Kishkovich et al. | 96/108 |
| 2002/0096051 A1 | * | 7/2002 | Kames | 96/154 |
| 2002/0157535 A1 | * | 10/2002 | Kanazirev et al. | 95/96 |
| 2003/0094102 A1 | * | 5/2003 | Maeoka et al. | 96/226 |
| 2003/0131728 A1 | * | 7/2003 | Kanazirev et al. | 95/96 |
| 2003/0140785 A1 | * | 7/2003 | Koslow | 95/90 |
| 2003/0196549 A1 | * | 10/2003 | Rohrbach et al. | 95/90 |
| 2003/0226443 A1 | * | 12/2003 | Rajagopalan et al. | 95/133 |
| 2004/0074391 A1 | * | 4/2004 | Durante et al. | 95/285 |
| 2004/0159237 A1 | * | 8/2004 | Fuchs | 96/108 |
| 2004/0255785 A1 | * | 12/2004 | Koslow | 96/154 |
| 2004/0261385 A1 | * | 12/2004 | Brey et al. | 55/524 |
| 2005/0145224 A1 | * | 7/2005 | Zulauf et al. | 123/518 |
| 2006/0042208 A1 | * | 3/2006 | Cummins et al. | 55/524 |
| 2006/0048648 A1 | * | 3/2006 | Gibbs et al. | 96/108 |
| 2006/0137529 A1 | * | 6/2006 | Emig et al. | 96/153 |
| 2007/0012191 A1 | * | 1/2007 | Witham et al. | 96/108 |
| 2007/0113739 A1 | * | 5/2007 | Porter | 96/134 |

\* cited by examiner

*Primary Examiner*—Jason M Greene
*Assistant Examiner*—Dung Bui
(74) *Attorney, Agent, or Firm*—Neugeboren O'Dowd PC

(57) ABSTRACT

Systems and methods are provided for substantially reducing undesired cumulative effects by preferentially heating the active particles. By preferentially heating the active particles, the active particles are "cleaned" of substances that may reduce or negate particle activity. In addition, preferential heating may reduce active particle adsorption of binder.

28 Claims, 4 Drawing Sheets

SYSTEMS AND METHODS FOR PREFERENTIALLY HEATING ACTIVE PARTICLES AND ARTICLES PRODUCED THEREOF

This application claims the benefit of U.S. Provisional Application No. 60/713,447, filed Aug. 31, 2005, the disclosure of which is incorporated by reference herein in its entirety.

BACKGROUND OF THE DISCLOSURE

This disclosure relates to methods and systems for producing materials having surface-active particles incorporated therein, and more particularly, to maximizing the surface-activity of particles capable of being preferentially heated.

It is known that certain particles can be used to add performance properties to materials in different forms such as gases, liquids, and solids. These particles can have properties that are suitable for odor adsorption, moisture management, ultraviolet light protection, chemical protection, bio-hazard protection, chemical warfare protection, fire retardance, anti-bacterial protection, antiviral protection, antifungal protection, antimicrobial protection, and other factors, and combinations thereof.

These particles can provide such properties because they are "active". That is, the surface of these particles may be active. Surface active particles are active because they have the capacity to adsorb or trap substances, including substances that may themselves be a solid, liquid, and/or gas, for example, pollen, water, butane, and ambient air. Active particles have an adsorptive property because each particle has a multitude of pores (e.g., pores on the order of thousands, tens of thousand, or hundreds of thousands per particle). It is these pores that provide the particle or, more particularly, the surface of the particle with its activity (e.g., capacity to adsorb). For example, an active particle such as activated carbon can adsorb a substance (e.g., butane) by trapping the substance in the pores of the activated carbon.

Exposing the active particles to a substance can reduce or permanently negate the activity of the active particles by blocking or inhibiting the pores, thus reducing the surface activity of the active particles. That is, once the pores are blocked or inhibited with a substance, those blocked or inhibited pores may be prevented from further adsorption. However, the adsorptive capacity of active particles can be increased or restored by removing the substance that is blocking or inhibiting the pores. Hence, active particles can be rejuvenated or reactivated.

A common problem associated with active particles is that they may lose activity or become permanently deactivated before, during, or after a process that incorporates the particles into a material. For example, active particles may lose a portion of their activity when exposed to contaminants in the ambient environment prior to being used in a process or during shipment from the active particle manufacturer to the end-user. Regardless of how particle activity is negated or reduced, such negation or reduction thereof may adversely affect the product produced by the process. For example, if particle activity is reduced, heavier particle loading may be required to make up for the reduction in activity, potentially resulting in particle loadings that affect the inherent characteristics (e.g., hand and feel) of the material treated in the process. Moreover, heavier particle loading may require increased binder loadings, which may further affect the inherent characteristics of the material treated in the process. Thus, it will be understood that even the smallest diminution of particle activity may adversely affect the material because of the cumulative affects (e.g., additional particle and binder loadings) stemming from that reduction.

Accordingly, methods and systems for treating the active particles to reduce cumulative effects are needed.

SUMMARY OF THE DISCLOSURE

Systems and methods are provided for substantially reducing the cumulative effects by preferentially heating the active particles in accordance with the principles of the present invention. By preferentially heating the active particles, the active particles are "cleaned" of substances that may reduce or negate particle activity. In addition, preferential heating may reduce active particle adsorption of binder by creating a temperature differential between the active particles and one or more substrates in which the active particles and binder are residing. The active particles may have a higher temperature than the substrate or substrates, thereby providing an environment in which the binder, when in a fluid uncured state, has a tendency to migrate away from the preferentially heated active particles to the substrate. By providing this environment, a lesser quantity of binder is adsorbed by the active particles, thus reducing one of the cumulative affects which negate active particle effective performance.

Preferential heating may be accomplished through application of infrared heat (IR heat) or other electromagnetic radiation. Electromagnetic radiation (e.g., IR heat), in contrast to convection or conduction based heating systems, provides heat directly to a predetermined location. This provides for application of relatively high temperatures, which may force activity reducing substances out of the pores of the active particles. It is understood that certain substances cannot be removed from the active particles unless high heat is applied to the active particles. It is further understood that certain materials (e.g., woven material) may be burned or sintered by application of prolonged periods of high heat. However, such burning or sintering is avoided by the systems and methods according to the invention because the active particles are preferentially heated. That is, the active particles absorb heat at a faster rate than the material on which the active particles reside, thereby enabling the active particles to be heated to a predetermined temperature before the material is heated to that same predetermined temperature. This ensures that the active particles are sufficiently heated to remove substances that otherwise could not be removed without damaging the material in which the active particles reside.

An article may be produced for use in chemical protection suits such as chemical warfare suits. The article may include first and second substrates produced, for example, from fibers obtained by extruding a mixture comprising active particles and a removable protective layer. An activated carbon layer may exist between the first and second substrates to provide a substantially impenetrable barrier to chemical warfare agents or other substances which may be harmful to the user of such article.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
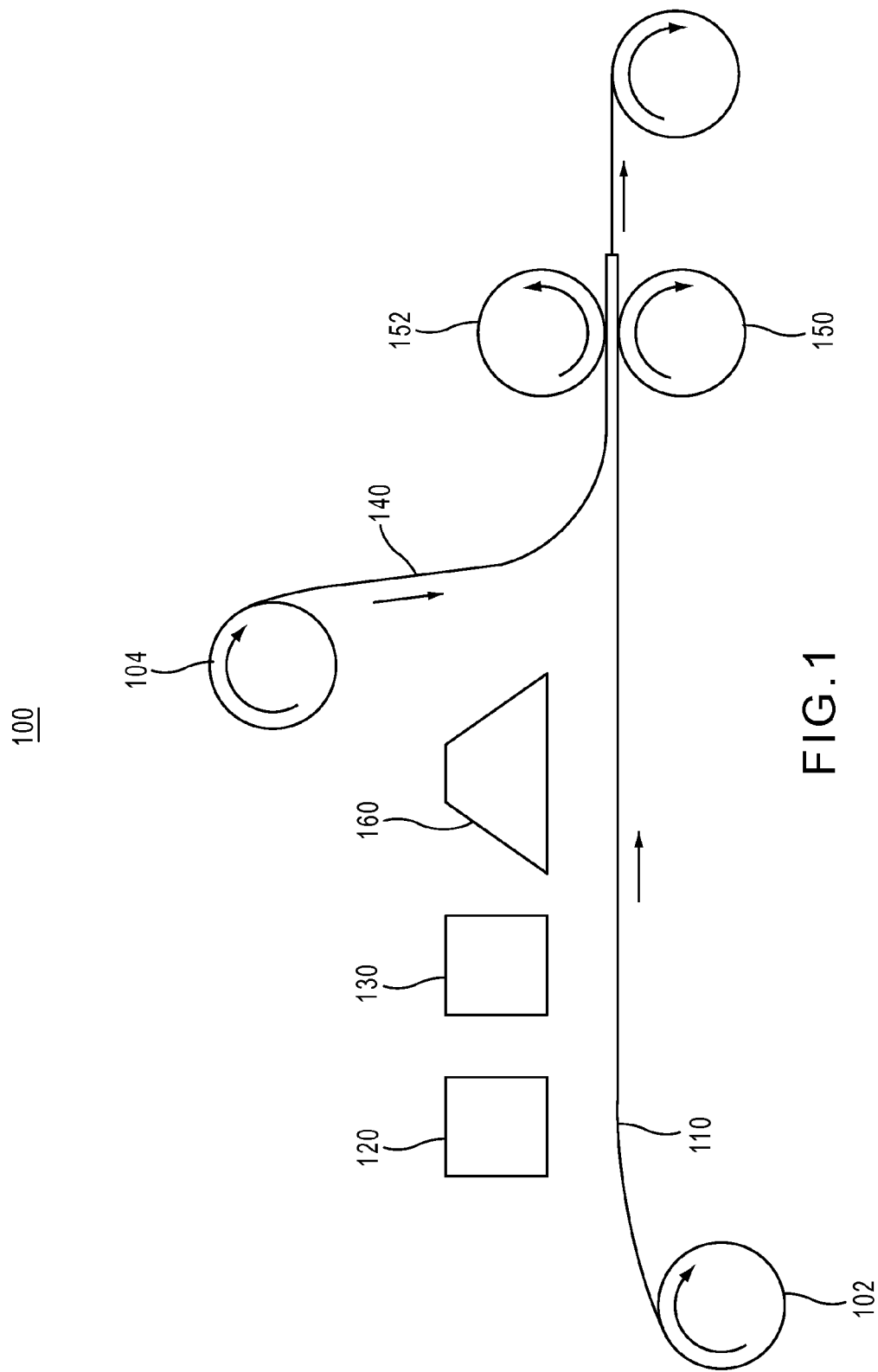
FIG. 1 shows an illustrative system for preferentially heating active particles incorporated into an article in accordance with the principles of the present invention.

Several embodiments for practicing the invention are now described. These embodiments are no means limiting and are presented as illustrations of different ways of practicing the invention. The process for treating a material with active particles may be implemented in a system used to preferentially heat active particles in accordance with the principles of the present invention. FIG. 1 shows an illustration of such a system. System 100 includes a first substrate feeder 102 that provides a first substrate 110, a binder application system 120 that applies binder to first substrate 110, an active particle application system 130 that applies active particles to first substrate 110, a second substrate feeder 104 that provides a second substrate 140 that is mated to the surface of first substrate 110 on which the active particles were applied, at least one calender roll 150 that contact heats first and second substrates 110 and 140, and at least one preferential heating source 160. It is understood that other components may be included as part of system 100 such as conveyor belts, but such components need not be discussed to facilitate understanding of the invention.

Generally, binder and active particles are applied to a first surface of first substrate 110. The binder may be applied first, and the active particles second, or vice versa. If desired, the binder may be applied in a predetermined pattern (e.g., dots) on the base material. Alternatively, the binder and active particles may be simultaneously applied to the base material in which case system 120 and 130 may be merged together. First substrate 110 may represent a base layer and second substrate 140 may represent a laminate layer.

After the binder and activated particles are applied to first substrate 110, second substrate 140 may be mated to first substrate 110 and the combination is routed through the calender roll 150 and nip roller 152. Calender roll 150 contact heats first and second substrate 110 and 140, thereby causing the binder to cure, or least begin to set, to permanently fix first and second substrates 110 and 140 together. In addition, the cured or setting binder permanently fixes the active particles (e.g., particles in contact with the binder) to first substrate 110, second substrate 140, or both. It is understood that curing of binder may not be an instantaneous process. For example, in some embodiments, IR heat may, in addition to preferentially heating the active particles (as discussed below), initiate curing, the calender roll may substantially complete curing, and curing may be finalized by storing the product in a temperature controlled room for a predetermined period of time. In other embodiments, IR heat may be used after the calender step to further cure the binder.

In accordance with the principles of the present invention, the active particles are preferentially heated. It is believed that by preferentially heating the active particles, this provides for less clogging of the pores by the binder, thereby resulting in a higher percentage of activity for a given volume of active particles than if no preferential heat treatment is provided. That is, it is believed that the heated particles cause the binder in contact thereto to remain in a fluid (uncured) state longer than binder that is not in contact with the particles, resulting in less pore blockage (by the binder) when the binder eventually cures. Thus, by causing the binder to remain in a fluid state when in contact with the active particles, the binder has more of a tendency to be absorbed by either the first or second substrates than to be adsorbed by the active particles.

The active particles may be preferentially heated, at least compared to first substrate 110 and second substrate 140, because the active particles have a higher extinction coefficient than first and second substrates 110 and 140. The extinction coefficient for a particular substance is a measure of how well it absorbs electromagnetic radiation (e.g., IR heat), or the amount of "impedance" the material offers for the passage of electromagnetic radiation through it. If the electromagnetic radiation can pass through very easily, the material has a low extinction coefficient. If the radiation hardly penetrates the material, but rather quickly becomes "extinct" within it, the extinction coefficient is high.

As defined herein, a preferential heating source is a device or system capable of directly applying heat in the form of electromagnetic radiation. For example, an infra red heat source, which provides electromagnetic radiation in the infra red spectrum, may be used as a preferential heating source. The IR heat source may be, for example, a flat plated IR lamp or a concave IR lamp.

Preferential heating sources may be used in one or more locations in a system (e.g., system 100 o FIG. 1) which preferentially heats active particles in accordance with the invention to preferentially heat active particles. The position of any given preferential heating source may vary depending on several different factors such as the speed at which the substrate is fed through the system, heat intensity of electromagnetic radiation output, the type of substrate or substrates used, the active particles used, the distance perpendicular to the substrate the preferential heating source positioned, and any other suitable factors that may be taken into account to optimize the position of a given preferential heating source.

Many of the foregoing mentioned factors may be taken into account to determine the temperature or intensity of the electromagnetic radiation provided by the preferential heating source. For example, it is desirable for a preferential heating source to provide a temperature that does not materially harm (e.g., sinter or burn) the substrate, but yet has a sufficient intensity to preferentially heat the active particles.

In one embodiment, it is desired that the above factors are selected such that the preferential heating is only able to effectively heat the active particles and not the substrate or substrates (though there may be slight residual heating of the substrate). It is understood that preferential heating does not result in the active particles and the substrate having substantially similar temperatures (which may occur in prior art heating processes). For example, in one approach, preferential heating may be achieved by exposing a substrate having the binder and active particles applied thereto for about six seconds with an IR heat source, which emits heat at 150° C. and is located about 18 vertical inches above the substrate.

In one embodiment, as shown in FIG. 1, a preferential heating source may be positioned such that it applies heat to first substrate 110 substantially immediately after active particles are applied to first substrate 110. As such, the active particles and first substrate may be preferential heated prior to when second substrate 140 is mated to substrate 110 and before the mated combination thereof passed through the calender roll. An advantage of preferentially heating prior to mating and contact heating is the electromagnetic radiation does not have to penetrate second substrate 140.

In another embodiment, a preferential heating source may be positioned after the calender roll. In this embodiment, the preferential heating source preferentially heats the active particles without damaging the lamination layer or the base material, thereby further "cleaning" the active particles. In addition to the preferential heating, the IR heat source may also assist in curing the binder. In contrast to prior art systems and methods that use IR heat sources to effect curing, none of these prior art systems and methods have used IR heat sources to preferentially heat active particles contained within a laminated product.

In another embodiment the IR heat source may be positioned to heat the active particles prior to, or while, the active particles are being deposited. In this manner, the active particles can be subjected to preferential heating that could otherwise damage first and/or second substrates 110 and 140 if such preferential heating was applied thereto.

Other embodiments may use a combination of different preferential heating source positions to effect preferential heating. For example, preferential heating may be positioned to heat the particles substantially immediately after the particles are deposited on first substrate material and after the calender roll.

In another embodiment, the invention may be practiced without using second substrate 140 and the components associated therewith (e.g., second substrate feeder 104).

The first and second substrates may be a woven material. As used herein, a woven material refers to any material held together mechanically by looping the constituent yarns around each other in a non-random manner. The term woven is intended to refer to (1) classical woven materials in which a material is composed of two yarns, known as the warp and the weft (or fill); and to (2) knitted materials which generally consist of yarns that run in the same direction rather than perpendicular directions and, like classical woven materials, are held together mechanically. Examples of woven materials include, but are not limited to, fabric materials, such as those used in apparel applications, and sheet materials, such as those used in non-apparel applications. The term yarn is intended to refer to any continuous strand of material, such as, for example, yarn, fiber, thread, or string.

The first and second substrates may be a non-woven material or other substance that is not woven or non-woven. A non-woven material is made by fusing fibers together. This results in a random three-dimensional structure containing free volume, or pores. These pores have a wide range of volumes. This internal pore structure results in gas, liquid and solid permeability of the non-woven material. Examples of non-woven materials include foams, pulp fibers, and filter materials. Woven and knitted materials do not contain non-woven pore-like structures. Woven and knitted materials are made by weaving and knitting yarns and/or fibers into a regular structure. This regular pattern of weaving and knitting creates free volume (referred to herein as "gaps") between the woven or knitted yarns, permitting gases, liquids and solids to flow through the woven material. However, these gaps differ from the pores in a non-woven material. The gaps in a woven material are regular and can be classified as two dimensional, while the pores in a non-woven material are random and three-dimensional. The size of the gaps in a woven material are dependent on the type of weave or knit being used and the diameter of the yarn or fiber.

In one embodiment, a substrate (e.g., the second substrate) may be a water proof, breathable, film, an oleophobic material, or hydrophobic material.

It is understood that any combination of different type of substrates may be used for the first and second substrates. For example, the first and second substrates may both be woven materials. In another example, one substrate (e.g., the first substrate) may be a non-woven material and the other substrate (e.g., the second substrate) may be a woven material.

Preferably the woven or non-woven materials used in the preferential heating methods and system according to the invention are constructed using processes which produce fibers, yarns, and other articles from a mixture including a base material, active particles, and removable protective substances.

Active particles may be "protected" through use of at least one removable protective substance (or removable encapsulant). Introduction and removal of the protective substance results in enhanced active performance, such as for example, enhanced adsorption, moisture management, anti-microbial functionality, anti-fungal functionality, anti-bacterial, and catalytic interaction as compared to performance of the active particles if the protective substance had not been introduced. Protected active particles may enhance the effective performance of materials incorporating such active particles through use of the removable protective substance.

A more specific aspect of protected active particles is that the removable protective substance preserves the activity of active particles against premature deactivation caused by deleterious or non-deleterious substances or matter (such as deleterious adsorption of a base material during extrusion of a composition including the active particles and base material or a drawing of a film including the active particles and base material solution), such active particles having the ability to interact through particle surface exposure or particle surface proximity to various substances or matter (of any phase). Deleterious substances are substances that cannot be easily removed or cannot ever be removed from an active particle and therefore reduce the active particle's capacity for further adsorption. For example, a deleterious substance such as a molten polymer may permanently deactivate active particle. A molten polymer, for example, cannot be removed without damaging the active particle or the substance surrounding the active particle.

Other substances that are prematurely adsorbed may be relatively easy to remove. That is, these types of substances can be removed using known methods of rejuvenation or reactivation that do not damage the active particles or the surrounding substance. For example, when a non-deleterious substance such as methane is adsorbed, it may be removed from the active particle by heating the particle.

Such preservation is achieved through use of at least one removable protective substance (or removable encapsulant) to maintain the active particles in a protected state to prevent premature deactivation, in a manner enabling removal of the protective substance during reactivation to permit subsequent active performance by the active particles. When an active particle is in a protected or deactivated state, its further performance interaction is temporarily or permanently reduced or negated altogether. If the deactivated state is the result of a deleterious event (such as for example, adsorption of a deleterious substance or matter), the further interaction at the affected areas of the particle is more permanent. Deleterious premature deactivation may occur in a variety of circumstances, including for example, when the active particle is introduced to a deleterious slurry or exposed to an extrusion process or other deleterious event or material at a time that will result in the inability of the particles to provide active performance at the desired time (such as for example, drawing a film of the material containing the particles). Deleterious deactivation can occur and not constitute premature deactivation, if such deactivation occurs at the desired or appropriate time (for example, after drawing of a film and in connection with an intended target substance or matter).

In the case of adsorptive activity and moisture management, when a removable protective substance is introduced to the active particle prior to exposure of the active particle to a deleterious event or other adsorptive performance limiter, the active particle is placed in a protected or deactivated state, limiting performance adsorption of the active particle for the time when premature deactivation is to be avoided. Reactivation by removal of the protective substance re-enables the active particles to interact with other substances or matter, such as for example, target substances or matter in the environment of a finished article incorporating the active particles.

When deactivation is the result of performance activity (in this case, performance adsorption) by the particles when incorporated in an article (adsorption at a time after removal of the removable protective substance), performance activity may be restored through rejuvenation (or other reactivation) if desired and if such deactivation was due to a non-deleterious event. A process of rejuvenation may include, for example, a washer/dryer cycling of a gas adsorption sheet of the invention. Another process of rejuvenation may include, for example, irradiating the gas adsorption sheet with different wavelengths of light.

With respect to the use of active particles to enhance performance activity in a base material (whether the activity is adsorptive, anti-microbial, dependent upon exposure of the surface of the particle to an environmental target of interaction, or simply an activity that is inhibited and/or enhanced through use of a removable protective substance), use of at least one removable encapsulant also enables use of fewer active particles in the embedding substance or matter (or in a resultant article) to achieve effective active performance, thereby reducing potential degradation of other physical properties (for example, strength or feel) of the base material, matter or resultant article (e.g., gas adsorption sheet).

The use of a removable protective substance (sometimes referred to herein as removable encapsulant or removable protective layer) can also be designed to enable time-delayed exposure of a portion of active particles to effect an initial exposure or enhanced active performance at a later time (including for example, enhancement resulting from protection against premature deactivation).

Removable protective substances can include, but are not limited to, water-soluble surfactants, surfactants, salts (e.g., sodium chloride, calcium chloride), polymer salts, polyvinyl alcohols, waxes (e.g., paraffin, carnauba), photo-reactive materials, degradable materials, bio-degradable materials, ethoxylated acetylenic diols, starches, corn starch, lubricants, glycols, and any other suitable substances. Specific examples of such protective substances that are suitable for protecting active particles include the Surfynol AE03, AE02, 485W, 485, 2502, and 465 water soluble surfactants, sold by Air Products and Chemicals Corporation, of Allentown, Pa., waxes sold as Textile Wax-W and Size SF-2, by BASF Corporation, of Charlotte, N.C., and waxes sold as model numbers Kinco 878-S and Kinco 778-H by Kindt-Collins Company, of Cleveland, Ohio. Glycols sold by DOW Chemical Company under the name DOWANOL (DPnP, DPM, or DPMA) and TRITON CF-10 can also be used as a suitable protective substance.

An advantage of using the removable protective substance is that it increases the effective performance of the activated particles incorporated into a substrate used in a method according to the invention.

A more detailed explanation of processes which use protected active particles, the preparation and applications thereof, and removal of the protective substance can be found, for example, in U.S. patent application publication no. 2004/0018359, which is incorporated herein by reference in its entirety. It is noted that active particles may be protected by mixing the active particles into a slurry of at least one protective substance, which may or may not be diluted with a solvent (e.g., water). to further Many different active particles can be used in the systems and methods of the present invention. The active particles can include, but are not limited to, activated carbon, aluminum oxide (activated alumina), silica gel, soda ash, aluminum trihydrate, baking soda, p-methoxy-2-ethoxyethyl ester Cinnamic acid (cinoxate), zinc oxide, zealites, titanium dioxide, molecular filter type materials, and other materials capable of being heated by IR heat. In a preferred embodiment of the present invention, the active particles are activated carbon. Activated carbon may be derived, for example, from wood, bamboo, coal, coconut, or bithmus. Activated carbon may also be derived synthetically.

Many binders may be used in accordance with the invention. Such binders may be natural or synthetic latexes, including aqueous latexes. Suitable binders for use in a process of the present invention include, for example, moisture curable urethantes, polyurethanes, natural rubber latex, NEO-PRENE, styrene butadiene, acrylic/acrylonitrile copolymer, modified n-butyl acrylonitrile copolymer, acrylonitrile polyvinyl acetate, polyacrylate, acrylonitrile butadiene, acrylic methyl methacrylate, self cross linking copolymers of vinyl acetate and ethylene, polyvinyl alcohol, polyvinyl acetate, vinyl chloride copolymers, melamine-formaldehyde resins, solutions of starch, carboxymethyl cellulose, methyl cellulose, sodium silicate, and siloxanes, including functionalized siloxanes, or combinations of the above (provided that each component of the combination should be compatible with each other component). In one embodiment, the binder may be a moisture based binder such as a polyurethane binder that cross-links when it cures.

Figure 2:
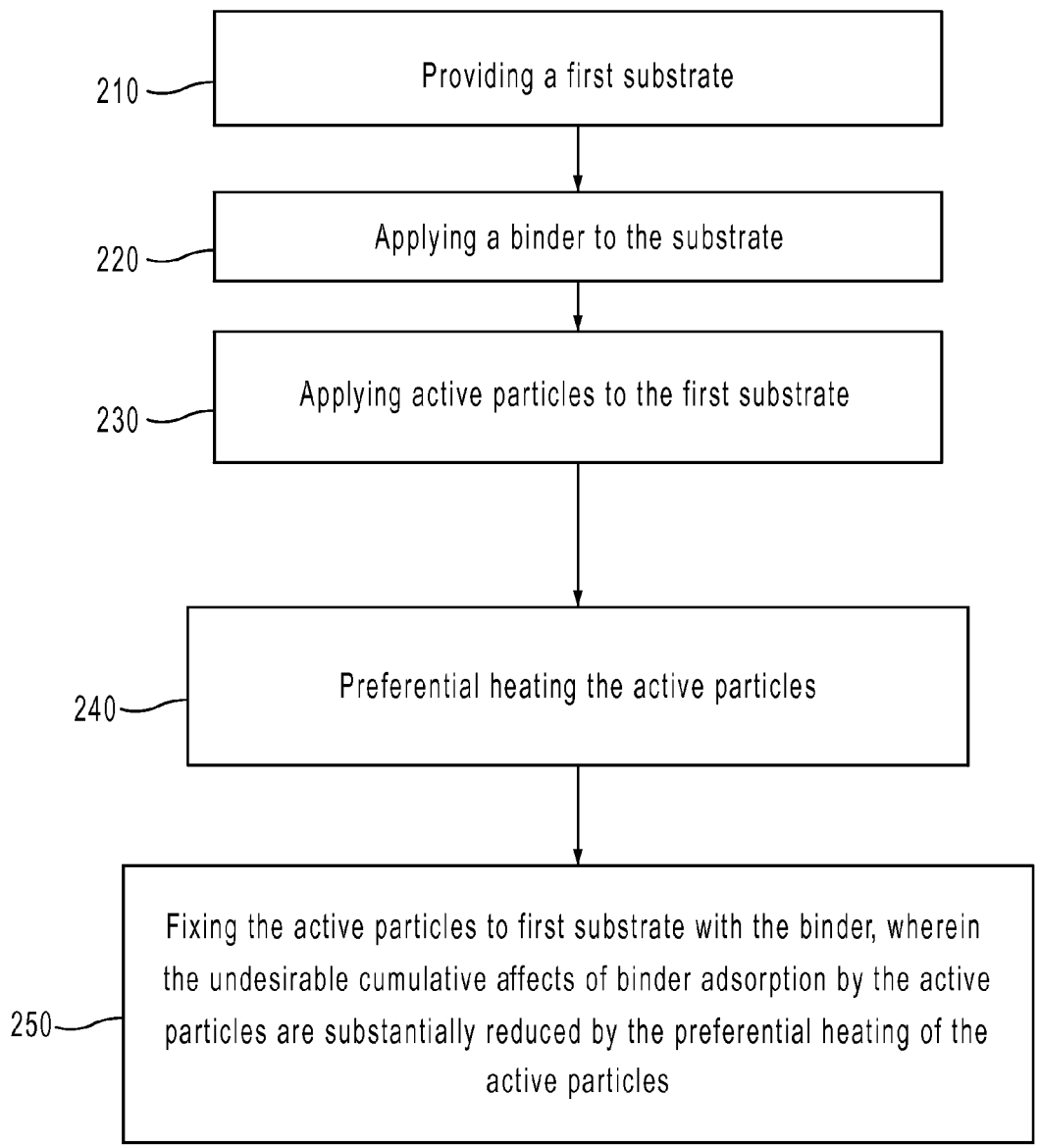
FIG. 2 is a flowchart showing steps that may be taken to preferentially heat active particles incorporated into an article in accordance with the principles of the present invention.

FIG. 2 shows a flowchart illustrating steps that may be taken in accordance with the principles of the present invention. At step 210, a first substrate (e.g., a non-woven material) is provided. At step 220, a binder is applied to the substrate. At step 230, active particles are applied to the first substrate. At step 240, the active particles may be preferentially heated. At step 250, the active particles are fixed to the first substrate with the binder, wherein the undesirable cumulative affects of binder adsorption by the active particles are substantially reduced by the preferential heating of the active particles.

It is understood that the steps shown in FIG. 2 are illustrative in that additional steps may be added and existing steps may be modified. It is further understood that the any combination of substrate, binder, and active particles such as those discussed above may be used in connection with the steps of FIG. 2.

Figure 3:
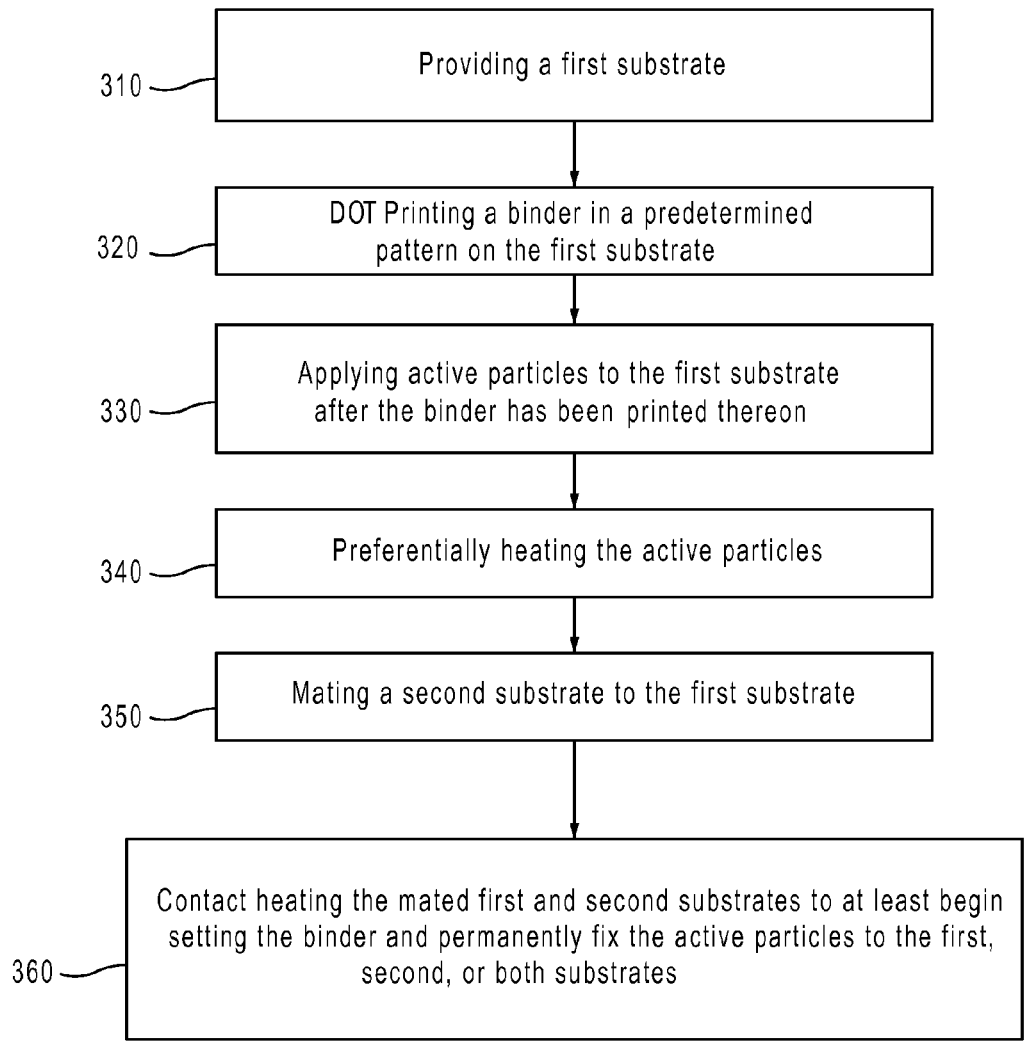
FIG. 3 is another flowchart showing steps that may be taken to preferentially heat active particles incorporated into an article in accordance with the principles of the present invention.

FIG. 3 shows another flowchart illustrating steps that may be taken in accordance with the principles of the present invention. Starting at step 310, a first substrate is provided. At step 320, a binder is dot printed in a predetermined pattern on the first substrate. The predetermined pattern may be such that the dots each have a predetermined volume and that the dots are spaced a minimum distance apart. In other words, the binder may not merely be gravity fed onto the substrate in a random pattern or such that it blanketly covers the substrate. In a preferred embodiment, the binder is applied as a hot melt. That is, the binder is in a non-solid state (e.g., a fluid, semi-solid, or gel-like state) when applied to the first substrate.

Such hot melt binder may be more conducive to reducing unwanted cumulative affects as it may have a greater proclivity to migrate away from preferentially heated active particles than its solid counterparts. In addition, the hot melt binder may set or cross-link faster than other types of binder, thereby further reducing unwanted cumulative affects.

At step 330, the active particles are applied to the substrate after the binder has been printed thereon. The active particles may be applied to the first substrate using a gravity feeding system. The activated carbon loading may be any desired loading.

At step 340, the active particles are preferentially heated. The active particles may be preferentially heated at different stages in the process, as discussed above in connection with FIG. 1. For example, the active particles may be preferentially heated prior to the particles being applied to the first substrate, immediately after the active particles are applied to the first substrate (but before the second substrate is mated to the first substrate), after the second substrate is mated to the first substrate (but before contact heating the mated first and second substrates), after contact heating the mated first and second substrates), or any combination thereof.

At step 350, a second substrate is mated with the first substrate. In effect, the substrate may be laid down on top of the first substrate, assisting in securing the active particles between the first and second substrates.

At step 360, the mated first and second substrates are contact heated to at least begin setting the binder and permanently fix the active particles to the first, second, or both substrates.

It is understood the steps shown in FIG. 3 are merely illustrative that additional steps may be added and existing steps may be modified. For example, instead of applying binder to the first substrate, the binder may be applied to the second substrate.

In embodiments where the substrate is a material including active particles prior to being used in a processing according to the invention, it may be desirable to preferentially heat the active particles included therein to mitigate undesired cumulative affects with respect to those active particles. For example, such substrates may include those derived from a mixture including at least active particles and a removable protective layer.

The systems and methods of the present invention may be used to produce articles for use in garment products that maintain the inherent characteristics of the first and second substrates, while simultaneously enhanced by the performance characteristics of the active particles incorporated therein. For example, the articles may be used to construct protective materials such as chemical warfare protective suits, protective gloves, protective boots or shoes or socks, protective covers, or anything else requiring a filtering application.

Figure 4:
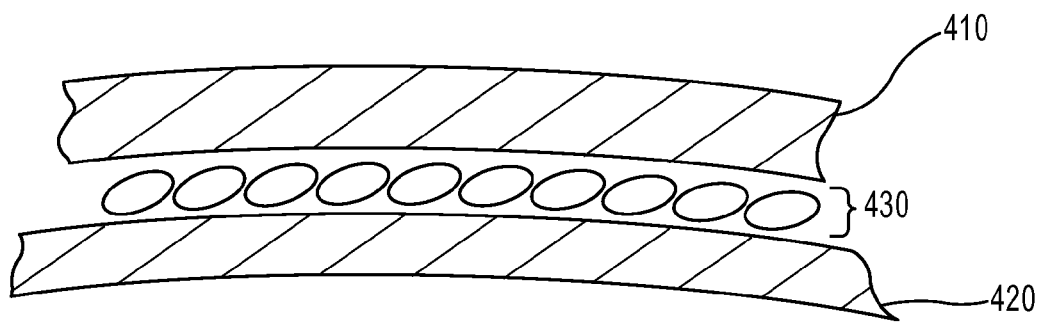
FIG. 4 is a cross-sectional view of an article in accordance with the principles of the present invention.

FIG. 4 shows an article 400 in accordance with the principles of the present invention. As shown, article 400 includes a first substrate 410, a second substrate 420, and an active particle layer 430 between first and second substrates 410 and 420. Article 400 may be produced using a preferential heating method discussed herein. Substrates 410 and 420 may include woven and non-woven materials as discussed above, including woven and non-woven materials having activated carbon or other active particles incorporated therein. If desired, substrates 410 and 420 may be constructed from a fiber or yarn extruded from a mixture including at least active particles (e.g., activated carbon) and a removable protective layer.

An advantage of article 400 is that it is able to provide protection against chemical warfare agents and other lethal agents while simultaneously providing breathability, odor control, and moisture management. In addition, the active particle loading in the active particle layer is such that maximum coverage is obtained (e.g., military specifications requires 100% active particle coverage to prevent passage of harmful agents therethough) while minimizing costs. Furthermore, article 400 in and of itself (i.e., without requiring any other layers such as textile layers or materials for structural support) may be sufficient in serving as a "standalone" article in, for example, a protective suit. That is, such benefits may be realized using only substrates 410 and 420 and active particle layer 430.

Active particle layer 430 may include activated carbon. In one embodiment, the activated carbon may be synthetically derived activated carbon. Such synthetically derived activated carbon may have an average mean particle size between 1-500 μm, 1-80 μm, 90-125 μm, 180-250 μm, and 250-500 μm. In a preferred embodiment, the activated carbon particles may include a mixture in which approximately 50% of the particles have a mean diameter ranging between 180-250 μm and the other approximate 50% of the particles have a mean diameter ranging between 90-125 μm.

The loading of activated carbon particles in active particle layer 430 may be 16-132 $g/m^2$, 38-76 $g/m^2$, or more preferably 55-65 $g/m^2$. Such loadings, especially the more preferred loading, provides a relatively lightweight article which also provide 100% protection against chemical warfare agents.

In an embodiment where article 400 has substrates 410 and 420 constructed from either fibers or yarn extruded from a mixture including at least active particles and removable protective substances, further advantages of weight and cost savings may be realized for at least the reason the removable protective substances enables the substrate to be constructed with a lesser quantity of active particles, yet still retain the same level of protection effectiveness as a substrate having a higher quantity of active particles. Another advantage of such substrates is that the lower loadings of active particles results in lower weight, contributing to an overall lower weight of article 400.

Thus, system and methods for preferentially heating active particles to reduce undesired cumulative affects and articles produced thereof are provided. A person skilled in the art will appreciate that the present invention can be practiced by other than the described embodiments, which are presented for purposes of illustration rather than of limitation, and the present invention is limited only by the claims which follow.

What is claimed is:

1. An adsorption article, comprising:
   first and second substrates produced from fibers obtained by extruding a mixture comprising active particles having a removable protective layer, the first and second substrates comprising the active particles of the mixture;
   an activated carbon layer between the first and second substrates, the activated carbon layer comprising activated carbon particles; and wherein,
   the activated carbon particles and the active particles are adapted to be preferentially heated compared to at least the first substrate and second substrate in a process for producing the adsorption article, the preferential heating resulting in a higher percentage of active particle activity.

2. The adsorption article defined in claim 1, wherein the first and second substrates are fixed together with a binder.

3. The adsorption article defined in claim 2, wherein the binder fixes the activated carbon particles to the first, second, or both substrates.

4. The adsorption article defined in claim 1, wherein the activated carbon particles are synthetically derived activated carbon particles.

5. The adsorption article defined in claim 1, wherein the activated carbon particles have a mean diameter ranging between 1-500 μm.

6. The adsorption article defined in claim 1, wherein the activated carbon particles have a mean diameter ranging between 250-500 μm.

7. The adsorption article defined in claim 1, wherein the activated carbon particles have a mean diameter ranging between 180-250 μm.

8. The adsorption article defined in claim 1, wherein the activated carbon particles have a mean diameter ranging between 90-125 μm.

9. The adsorption article defined in claim 1, wherein the activated carbon particles have a mean diameter ranging between 1-80 μm.

10. The adsorption article defined in claim 1, wherein the activated carbon particles comprise a mixture in which approximately 50% of the particles have a mean diameter ranging between 180-250 μm and the other approximate 50% of the particles have a mean diameter ranging between 90-125 μm.

11. The adsorptive article defined in claim 1, wherein the active particles comprise activated carbon.

12. The adsorptive article defined in claim 1, wherein the activated carbon particles occupy a predetermined loading range between 16-132 $g/m^2$.

13. The adsorptive article defined in claim 1, wherein the activated carbon particles occupy a predetermined loading range between 38-76 $g/m^2$.

14. The adsorptive article defined in claim 1, wherein the activated carbon particles occupy a predetermined loading range between 55-65 $g/m^2$.

15. An adsorption article, comprising:
first and second substrates produced from fibers obtained by extruding a mixture comprising active particles having a removable protective layer, the first and second substrates comprising the active particles of the mixture;
an activated carbon layer between the first and second substrates, the activated carbon layer comprising activated carbon particles; and wherein,
the activated carbon particles are adapted to be preferentially heated compared to at least the first substrate and second substrate in a process for producing the adsorption article, the preferential heating resulting in a higher percentage of active particle activity.

16. The adsorption article defined in claim 15, wherein the first and second substrates are fixed together with a binder.

17. The adsorption article defined in claim 16, wherein the binder fixes the activated carbon particles to the first, second, or both substrates.

18. The adsorption article defined in claim 16, wherein the activated carbon particles are synthetically derived activated carbon particles.

19. The adsorption article defined in claim 16, wherein the activated carbon particles have a mean diameter ranging between 1-500 μm.

20. The adsorption article defined in claim 16, wherein the activated carbon particles have a mean diameter ranging between 250-500 μm.

21. The adsorption article defined in claim 16, wherein the activated carbon particles have a mean diameter ranging between 180-250 μm.

22. The adsorption article defined in claim 16, wherein the activated carbon particles have a mean diameter ranging between 90-125 μm.

23. The adsorption article defined in claim 16, wherein the activated carbon particles have a mean diameter ranging between 1-80 μm.

24. The adsorption article defined in claim 16, wherein the activated carbon particles comprise a mixture in which approximately 50% of the particles have a mean diameter ranging between 180-250 μm and the other approximate 50% of the particles have a mean diameter ranging between 90-125 μm.

25. The adsorptive article defined in claim 16, wherein the active particles comprise activated carbon.

26. The adsorptive article defined in claim 16, wherein the activated carbon particles occupy a predetermined loading range between 16-132 $g/m^2$.

27. The adsorptive article defined in claim 16, wherein the activated carbon particles occupy a predetermined loading range between 38-76 $g/m^2$.

28. The adsorptive article defined in claim 16, wherein the activated carbon particles occupy a predetermined loading range between 55-65 $g/m^2$.

* * * * *